(12) United States Patent
Takeda et al.

(10) Patent No.: US 11,553,473 B2
(45) Date of Patent: Jan. 10, 2023

(54) TERMINAL, RADIO COMMUNICATION METHOD, AND BASE STATION

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/980,286

(22) PCT Filed: Mar. 14, 2018

(86) PCT No.: PCT/JP2018/010055
§ 371 (c)(1),
(2) Date: Sep. 11, 2020

(87) PCT Pub. No.: WO2019/176032
PCT Pub. Date: Sep. 19, 2019

(65) Prior Publication Data
US 2021/0250917 A1 Aug. 12, 2021

(51) Int. Cl.
*H04W 72/04* (2009.01)
(52) U.S. Cl.
CPC .................. *H04W 72/042* (2013.01)
(58) Field of Classification Search
CPC .................................................. H04W 72/042
See application file for complete search history.

(56) References Cited

U.S. PATENT DOCUMENTS

2013/0215853 A1\* 8/2013 Li ..................... H04W 72/04
2020/0344762 A1 10/2020 Takeda et al.

FOREIGN PATENT DOCUMENTS

EP 3 739 996 A1 11/2020

OTHER PUBLICATIONS

Extended European Search Report in counterpart European Application No. 18 90 9520.1 dated Oct. 13, 2021 (9 pages).
NTT Docomo, Inc.; "Offline outcome of search space"; 3GPP TSG RAN WG1 Meeting 92, R1-1803436; Athens, Greece; Feb. 26-Mar. 2, 2018 (8 pages).
NTT Docomo, Inc.; "Search space"; 3GPP TSG RAN WG1 Meeting #92, R1-1802480; Athens, Greece; Feb. 26-Mar. 2, 2018 (17 pages).
International Search Report issued in PCT/JP2018/010055 dated May 29, 2018 (1 page).
Written Opinion of the International Searching Authority issued in PCT/JP2018/010055 dated May 29, 2018 (4 pages).
(Continued)

*Primary Examiner* — Ronald B Abelson
(74) *Attorney, Agent, or Firm* — Osha Bergman Watanabe & Burton LLP

(57) ABSTRACT

A terminal is disclosed including a receiver that receives information comprising a first indicator regarding a search space set categorization and a second indicator regarding a search space set index, the first indicator and the second indicator corresponding to each of one or more search space sets; and a processor that controls a monitoring of downlink control channel candidates allocated to each of the search space sets based on the search space set categorization and the search space set index. In other aspects, a radio communication method and a base station are also disclosed.

4 Claims, 11 Drawing Sheets

| CCE AGGREGATION LEVEL | NUMBER OF CANDIDATES |
|---|---|
| 4 | 4 |
| 8 | 2 |
| 16 | 1 |

(56) References Cited

OTHER PUBLICATIONS

LG Electronics.; "Remaining issues on search space"; 3GPP TSG RAN WG1 Meeting #92, R1-1802207; Athens, Greece; Feb. 26-Mar. 2, 2018 (4 pages).
NTT Docomo, Inc.; "Offline summary for AI 7.1.3.1.2 Search space"; 3GPP TSG RAN WG1 Meeting #92, R1-1803299; Athens, Greece; Feb. 26-Mar. 2, 2018 (3 pages).
NTT Docomo, Inc.; "Offline outcome of search space"; 3GPP TSG RAN WG1 Meeting 92, R1-1803466; Athens, Greece; Feb. 26-Mar. 2, 2018 (2 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
Office Action issued in Japanese Application No. 2020-506039 dated Mar. 22, 2022 (6 pages).
Nokia, Nokia Shanghai Bell, "On reducing the PDCCH channel estimation and BD complexity in NR", 3GPP TSG RAN WG1 Ad Hoc 1801, R1-1800550, Vancouver, Canada, Jan. 22-26, 2018 (14 pages).

* cited by examiner

FIG. 1A

| MAXIMUM NUMBER OF TIMES OF PDCCH BLIND DECODING PER SLOT | SUBCARRIER-SPACING (SCS) | | | |
|---|---|---|---|---|
| | 15kHz | 30kHz | 60kHz | 120kHz |
| CASE 1-1 | 44 | 36 | 22 | 20 |
| CASE 1-2 | 44 | | | - |
| CASE 2 | 44 | 36 | 22 | 20 |

FIG. 1B

| CCE AGGREGATION LEVEL | NUMBER OF CANDIDATES |
|---|---|
| 4 | 4 |
| 8 | 2 |
| 16 | 1 |

TERMINAL, RADIO COMMUNICATION METHOD, AND BASE STATION

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE (also referred to as LTE Rel. 8 or 9), LTE-Advanced (also referred to as LTE-A or LTE Rel. 10, 11 or 12) has been specified. LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) have been also studied.

Legacy LTE systems (e.g., LTE Rel. 8 to 13) perform communication on Downlink (DL) and/or Uplink (UL) by using a subframe (also referred to as Transmission Time Intervals (TTI)) of 1 ms. The subframe is a transmission time unit of 1 channel-coded data packet, and is a processing unit of scheduling, link adaptation and retransmission control (HARQ: Hybrid Automatic Repeat reQuest).

A radio base station controls allocation (scheduling) of data to a user terminal, and notifies the user terminal of scheduling of data by using Downlink Control Information (DCI). The user terminal monitors and performs reception processing (e.g., demodulation and decoding processing) on a downlink control channel (PDCCH) on which the downlink control information is transmitted, and controls reception of DL data and/or transmission of uplink data based on the received downlink control information.

Transmission of downlink control channels (PDCCH/EPDCCH) is controlled by using an aggregation of 1 or a plurality of Control Channel Elements (CCEs/Enhanced Control Channel Elements (ECCEs)). Furthermore, each control channel element includes a plurality of Resource Element Groups (REGs/Enhanced Resource Element Groups (EREGs)). The resource element group is used, too, when a control channel is mapped on a Resource Element (RE).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

A future radio communication system (also referred to as NR below) is requested to support a plurality of numerologies, and needs to use a configuration different from those of legacy LTE systems (e.g., LTE Rel. 13 or prior releases). The numerologies refer to, for example, communication parameters (e.g., a subcarrier-spacing and a bandwidth) to be applied to transmission and reception of a certain signal.

Hence, according to NR, it is necessary to control transmission and reception of a different signal/channel (e.g., downlink control channel) from those of the legacy LTE systems. However, how to control transmission and reception of, for example, a downlink control channel has not yet been sufficiently studied. If a UE cannot appropriately receive, for example, the downlink control channel, there is a risk that a communication throughput lowers and communication quality deteriorates.

It is one of objects of the present disclosure to provide a user terminal and a radio communication method that, even when, for example, a control channel is transmitted and received according to a configuration different from those of legacy LTE systems, can prevent communication quality from lowering.

Solution to Problem

One aspect of a user terminal according to the present disclosure includes: a reception section that monitors a plurality of search space sets configured to 1 or more cells, and receives a downlink control channel; and a control section that controls the monitoring of the plurality of search space sets in which downlink control channel candidates have been mapped, based on at least one of categorizations of the search space sets, indices of the cells and indices of the search space sets.

Advantageous Effects of Invention

According to the present invention, even when, for example, a control channel is transmitted and received according to a configuration different from those of legacy LTE systems, can prevent communication quality from lowering.

BRIEF DESCRIPTION OF DRAWINGS

FIG. 1A is a diagram illustrating one example of a maximum number of times of blind decoding, and FIG. 1B is a diagram illustrating one example of the number of candidates associated with an AL.

DESCRIPTION OF EMBODIMENTS

Figure 2:
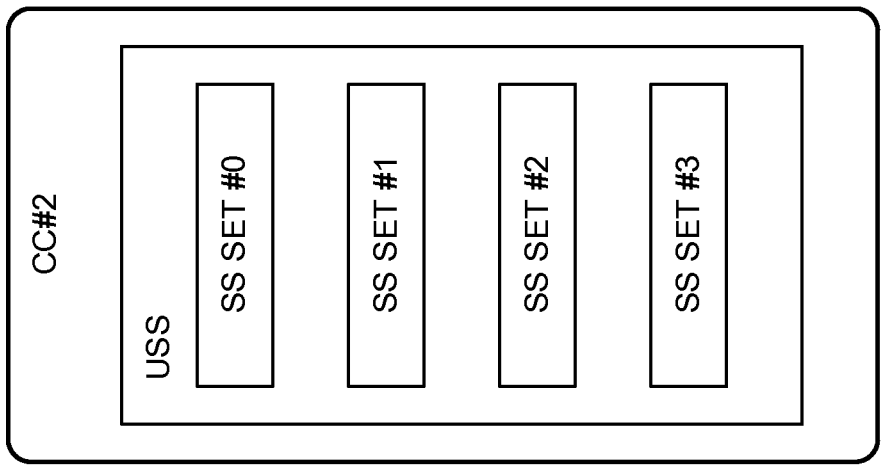
FIG. 2 is a diagram illustrating one example of a configuration of search space sets in each CC (or each cell).
Figure 2:
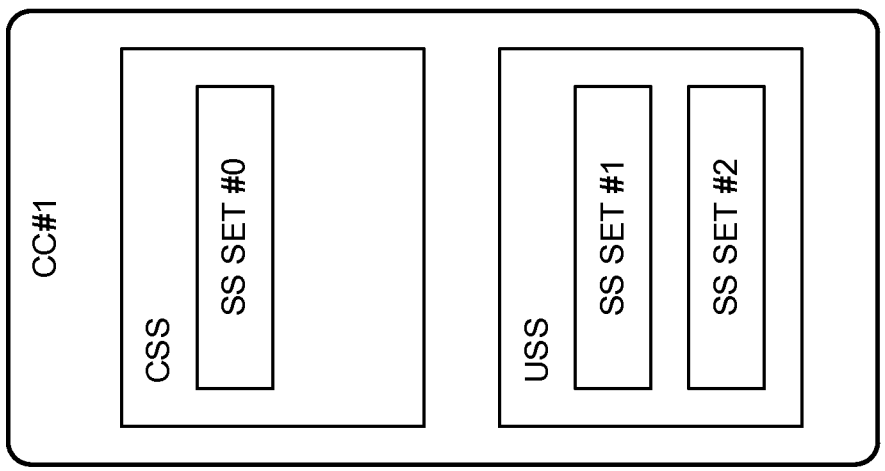
Figure 2:
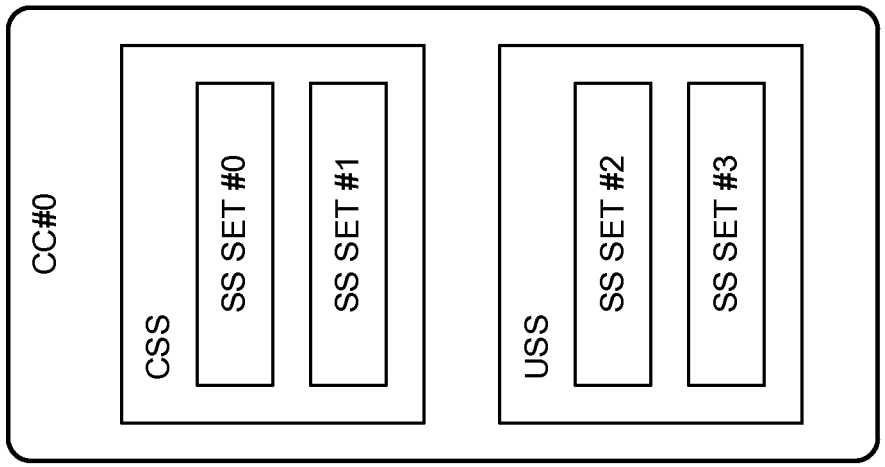

In legacy LTE systems, a radio base station transmits Downlink Control Information (DCI) to a UE by using a downlink control channel (e.g., a Physical Downlink Control Channel (PDCCH) or an Enhanced PDCCH (EPDCCH)). Transmission of the downlink control information may be read as transmission of a downlink control channel.

The DCI may be scheduling information including at least one of, for example, information indicating time/frequency resources for scheduling data, information indicating a transport block size, information indicating a data modulation scheme, information indicating an HARQ process identifier, and information related to a demodulation RS. The DCI for scheduling DL data reception and/or measurement of a DL reference signal may be referred to as a DL assignment or a DL grant, and the DCI for scheduling UL data transmission and/or transmission of a UL sounding (measurement) signal may be referred to as a UL grant.

The DL assignment and/or the UL grant may include information related to resources, a sequence or a transmission format of a channel for transmitting a UL control signal (UCI: Uplink Control Information) such as HARQ-ACK feedback for DL data or channel measurement information (CSI: Channel State Information). Furthermore, the DCI for scheduling the UL control signal (UCI: Uplink Control Information) may be specified separately from the DL assignment and the UL grant.

The UE is configured to monitor a set of a given number of downlink control channel candidates in a given time unit (e.g., subframe). In this regard, monitoring refers to, for example, trying to decode the set of each downlink control channel of a target DCI format. This decoding will be also referred to as Blind Decoding (BD) or blind detection. The downlink control channel candidate will be also referred to as a BD candidate or an (E)PDCCH candidate.

Furthermore, a search domain and a search method of the downlink control channel candidates will be defined as a Search Space (SS). The search space may be configured to include a plurality of Search Space sets (SS sets). In this case, 1 or a plurality of downlink control channel candidates are mapped in one of search space sets.

Furthermore, it has been studied for NR to use a COntrol REsource SET (CORESET) to transmit a physical layer control signal (e.g., Downlink Control Information)) from a base station to a UE.

The CORESET is a parameter set that is necessary for resource allocation of a control channel (e.g., Physical Downlink Control Channel (PDCCH)). The UE may receive CORESET configuration information (that may be referred to as a CORESET configuration) from the base station. The UE monitors a PDCCH based on at least the CORESET configuration information, and detects the physical layer control signal.

The CORESET configuration may be notified by, for example, a higher layer signaling. In this regard, the higher layer signaling may be one of, for example, a Radio Resource Control (RRC) signaling, a Medium Access Control (MAC) signaling and broadcast information, or may be a combination of these.

The UE may receive, from the base station, configuration information of a search space (that may be referred to as a search space configuration) in which the PDCCH is monitored. The search space configuration information may include information related to search space sets to be configured to the UE. Furthermore, the search space configuration information may be notified to the UE by, for example, a higher layer signaling (such as an RRC signaling). The search space sets configured by the search space configuration information may be configured in association with a CORESET. That is, the UE can monitor the PDCCH based on at least two of the CORESET configuration information and the search space configuration information.

The search space configuration information may mainly include information of a monitoring related configuration and a decoding related configuration of a PDCCH, and may include information related to, for example, at least one of the followings.

A search space set identifier (search space set ID)

A CORESET ID associated with the search space set

A flag indicating whether the search space set is a Common Search Space (C-SS: Common SS) that is commonly configured to UEs, or a UE-Specific Search Space (UE-SS: UE-Specific SS) that is configured per UE The number of PDCCH candidates per aggregation level A monitoring periodicity A monitoring offset A monitoring pattern (e.g., a bit map of 14 bits) in a slot The UE monitors the CORESET based on the search space configuration information. Furthermore, "monitoring of the CORESET" may be read as "monitoring of a search space (PDCCH candidate) associated with the CORESET", or "monitoring of a downlink control channel (e.g., PDCCH)".

The UE may decide an association between the search space set and the CORESET based on the search space set ID included in the above search space configuration information, and the CORESET ID. One CORESET may be associated with one or a plurality of search space sets. A case where one CORESET is associated with a plurality of search space configurations may be, for example, a case where both of a C-SS and a UE-SS are configured in the CORESET. In addition, one search space configuration may be associated with a plurality of CORESETs.

Furthermore, search spaces in which the UE monitors PDCCH candidates may be following search spaces. That is, search space categorizations may be categorized into the C-SS and the UE-SS, and a plurality of types of the C-SS may be further configured, or all of the following types of the C-SS may not be categorized and may be comprehensively handled as the C-SS.

Type 0-PDCCH C-SS

Type 0A-PDCCH C-SS

Type 1-PDCCH C-SS

Type 2-PDCCH C-SS

Type 3-PDCCH C-SS

UE-SS

The type 0-PDCCH C-SS may be referred to as an SS for a DCI format that is subjected to Cyclic Redundancy Check (CRC) masking (scrambling) by a System Information Radio Network Temporary Identifier (SI-RNTI).

The type 0A-PDCCH C-SS may be referred to as an SS for a DCI format that is subjected to CRC scrambling by the SI-RNTI. In this regard, the type 0-PDCCH may be used to notify, for example, the RMSI, and the type 0A-PDCCH may be used to notify, for example, other SI (OSI: Other SI).

The type 1-PDCCH C-SS may be referred to as an SS for a DCI format that is subjected to CRC scrambling by a Random Access RNTI (RA-RNTI), a Temporary Cell RNTI (TC-RNTI), or a Cell RNTI (C-RNTI).

The type 2-PDCCH C-SS may be referred to as an SS for a DCI format that is subjected to CRC scrambling by a Paging RNTI (P-RNTI).

The Type 3-PDCCH C-SS may be referred to as an SS for a DCI format that is subjected to CRC scrambling by an INTerruption RNTI (INT-RNTI) for a DL preemption instruction, a Slot Format Indicator RNTI (SFI-RNTI) for a slot format instruction, a TPC-PUSCH-RNTI for Transmit Power Control (TPC) of a Physical Uplink Shared Channel (PUSCH), a TPC-PUCCH-RNTI for TPC of a Physical Uplink Control Channel (PUCCH), a TPC-SRS-RNTI for TPC of a Sounding Reference Signal (SRS), a C-RNTI or a Configured Scheduling RNTI (CS-RNTI).

The UE-SS may be referred to as an SS for a DCI format that is subjected to CRC scrambling by the C-RNTI or the CS-RNTI. The UE-SS makes it possible to configure monitoring of at least one or a plurality of DCI formats 0_0, 0_1, 1_0 and 1_1.

The search space type may be also referred to as information that associates DCI features (a format and an RNTI) to be transmitted by PDCCH candidates to be monitored, and a search space.

By the way, a future radio communication system (NR) is demanded to control communication by applying a plurality of numerologies. For example, NR is assumed to perform transmission and reception by applying a plurality of sub-carrier-spacings (SCSs) based on, for example, a frequency band. The subcarrier-spacings to be applied include, for example, 15 kHz, 30 kHz, 60 kHz, 120 kHz and 240 kHz. Naturally, applicable subcarrier-spacings are not limited to these.

Furthermore, it is supposed to configure a maximum number of times of decoding (e.g., blind decoding) performed by the UE in advance to suppress, for example, an increase in a processing load of the UE. As illustrated in, for example, FIG. 1A, it is supposed to configure the maximum number of times of Blind Decoding (BD) per subcarrier-spacing to be applied to transmission of a PDCCH. In this regard, the maximum number of times of BD illustrated in FIG. 1A is one example, and is not limited to this. Furthermore, the number of times of BD may be read as the number of PDCCH candidates monitored by the UE.

The cases 1-1 and 1-2 illustrated in FIG. 1A correspond to cases where a monitoring periodicity of a PDCCH to be subjected to CRC scrambling by a C-RNTI or a CS-RNTI is 14 symbols or more. A case 2 corresponds to a case where the monitoring periodicity of the PDCCH to be subjected to CRC scrambling by the C-RNTI or the CS-RNTI is less than 14 symbols. That is, the cases 1-1 and 1-2 correspond to cases where the monitoring periodicity of the PDCCH to be subjected to CRC scrambling by the C-RNTI or the CS-RNTI is 1 time or less per 1 slot. The case 2 corresponds to a case where the monitoring periodicity of the PDCCH to be subjected to CRC scrambling by the C-RNTI or the CS-RNTI is 2 times or more per slot.

Furthermore, the case 1-1 may be applied to a case where the PDCCH is monitored from a head to a given symbol (e.g., a third symbol at maximum) of a slot. The case 1-2 may be applied to a case where the PDCCH is monitored in one of periods to given contiguous symbols (e.g., 3 symbols) in the slot. In addition, the cases 1-1 and 1-2 permit a case, too, where a plurality of times of monitoring are permitted in the given symbol period. That is, monitoring of the PDCCH in the given symbol period can be counted as 1 time in total.

The case 1-1 in FIG. 1A is a case where the maximum number of times of BD of the PDCCH per slot is 44 times when a Subcarrier-Spacing (SCS) is 15 kHz. Furthermore, this case 1-1 also indicates the case where the maximum number of times of BD in a case where the SCS is 30 kHz is 36 times, the maximum number of times of BD in a case where the SCS is 60 kHz is 22 times, and the maximum number of times of BD in a case where the SCS is 120 kHz is 20 times.

Generally, as the SCS becomes larger, the slot length becomes shorter. Therefore, when performing the same number of times of BD per slot on different SCSs makes the SCS larger, the UE needs to perform BD processing in a short time, and a processing load becomes high. Consequently, by making the maximum number of times of BD smaller as the subcarrier-spacing becomes larger, it is possible to suppress an increase in a load of UE reception processing (e.g., blind decoding).

Furthermore, it has been also studied to configure a maximum value of the number of candidates per CCE Aggregation Level (AL). FIG. 1B illustrates a case where 4, 2 and 1 are defined for ALs=4, 8 and 16, respectively. In addition, FIG. 1B illustrates a relationship between an AL used for a common search space of downlink control channels of given types (e.g., at least one of the type 0, the type 0A and the type 2) and the maximum number of candidates.

Furthermore, it has been studied that, in at least the case 1-1 and the case 1-2 in FIG. 1A, the UE supports channel estimation capability for a given number of CCEs in a scheduled given slot per cell. In this case, the UE has capability of performing channel estimation (e.g., demodulation processing) using at least the given number of CCEs in a given slot (e.g., 1 slot).

In a case of, for example, SCS=15 kHz and 30 kHz, the UE supports channel estimation using a first number of CCEs (e.g., 56 CCEs). That is, the UE can demodulate at least the first number of CCEs per given slot (e.g., 1 slot). Furthermore, in a case of SCS=60 kHz, the UE supports channel estimation using a second number of CCEs (e.g., 48 CCEs). Furthermore, in a case of SCS=120 kHz, the UE supports channel estimation using a third number of CCEs (e.g., 32 CCEs).

Thus, when the number of CCEs for channel estimation that the UE can support is configured, it is supposed to control mapping of the number of downlink control channel candidates (or monitoring of search spaces) by taking into account at least one of the number of times of blind decoding and the number of CCEs for channel estimation.

For example, mapping of the downlink control channel candidates in the search space sets is controlled to satisfy one or both of a first condition that indicates a given number of times of blind decoding (e.g., the maximum number of times of BD) or less, and a second condition that indicates the given number of CCEs for channel estimation or less. When, for example, one of the first and second conditions is not satisfied during a given slot or a given PDCCH monitoring duration, given downlink control channel candidates may be not be subjected to blind decoding.

A problem is how to control mapping (or allocation) of downlink control channel candidates in a plurality of search space sets when a plurality of search space sets are configured. It is also assumed that the number of times of BD or the number of CCEs for channel estimation is restricted and therefore downlink control channel candidates are mapped in only part of search space sets of a plurality of search space sets configured to the UE. That is, a problem is how to perform blind decoding on which downlink control channel candidates of which search space sets when one of the first and second condition is not satisfied.

In this case, how to determine search space sets in which the downlink control channel candidates are mapped. When the search space sets in which the downlink control channel candidate sets are mapped cannot be appropriately configured, there is a risk that the UE monitors unnecessary search space sets. In this case, there is a risk that a communication throughput lowers and communication quality deteriorates.

Furthermore, according to CA that uses a plurality of cells (or Component Carriers (CCs)), it is assumed to respectively configure search space sets to each cell. In this case, a problem is how to control mapping of downlink control channel candidates in search space sets of each cell.

The inventors of this application have focused on that, when a plurality of search space sets are configured, at least one of search space set categorizations, cell indices and search space set indices differ between a plurality of search space sets, and conceived controlling mapping of downlink control channel candidates based on at least one of the search space set categorizations, the cell indices and the search space set indices.

An embodiment according to the present invention will be described in detail below with reference to the drawings. Each of the following aspects may be each applied alone or may be applied in combination.

(First Aspect)

The first aspect will describe one example of control of mapping of downlink control channel candidates in a case where carrier aggregation is not applied (non-CA). For example, mapping of the downlink control channel candidates in 1 or more search space sets is controlled based on a given condition.

Mapping of the downlink control channel candidates in the search space sets is controlled to satisfy one or both of a first condition that indicates a given number of times of decoding (e.g., a maximum number of times of BD) or less, and a second condition that indicates a given number of CCEs for channel estimation or less. In a case of, for example, SCS=15 kHz, mapping of the downlink control channel candidates is controlled to satisfy one or both of the given number of times of BD (e.g., 44 times) or less that is the first condition and the given number of CCEs (e.g., 56 CCEs) for channel estimation or less that is the second condition.

Furthermore, mapping of the downlink control channel candidates (e.g., search space sets for mapping) is controlled based on at least one of search space categorizations, search space types, search space set IDs and aggregation levels to satisfy one or both of the first condition and the second condition.

Hereinafter, examples (options 1 to 3) of control of mapping of downlink control channel candidates will be described. The following description will describe an example of the search space categorizations (a CSS or a USS). However, mapping of the downlink control channel candidates may be controlled based on the search space types (which type the CSS is) in addition to the search space categorizations.

<Option 1>

Mapping of the downlink control channel candidates in the search space sets is controlled based on at least one of the search space categorizations and the search space types. For example, the search space sets associated with the CSS are prioritized over the search space sets associated with the USS. In one example, the downlink control channel candidates are mapped in the search space sets associated with the CSS prior to the search space sets associated with the USS.

Consequently, it is possible to preferentially allocate DCI that is commonly configured to a plurality of UEs, so that it is possible to prevent deterioration of quality of overall communication.

A UE performs reception processing (e.g., monitoring or BD processing) in a range that satisfies one or both of the first condition and the second condition. The UE may determine the search space sets to be monitored based on the search space categorizations. Furthermore, the UE may determine an order (monitoring order) of the search space sets to be monitored based on the search space categorizations.

For example, the UE may monitor the search space sets associated with the CSS prior to the search space sets associated with the USS. Alternatively, the UE may determine the search space sets to be monitored, based on the search space categorizations, and then control the monitoring order irrespectively of the search space categorizations.

(Option 2)

According to the option 2, mapping of the downlink control channel candidates is controlled by taking into account the search space set indices (also referred to as search space set IDs or search space IDs), too, in addition to at least one of the search space categorizations and the search space types. For example, mapping of the downlink control channel candidates in search space sets of the identical search space categorization is controlled based on an order of the search space IDs.

When, for example, a plurality of search space sets associated with the USS are configured, the downlink control channel candidates are mapped preferentially in the search space sets of small search space IDs. Alternatively, the downlink control channel candidates may be mapped preferentially in the search space sets of large search space IDs.

Consequently, even when a plurality of search space sets of the same search space categorization are configured, it is possible to map the downlink control channel candidates in given search space sets. By determining the search space sets to be monitored, based on the search space categorizations and the search space IDs within a range that satisfies one or both of the first condition and the second condition, the UE can appropriately monitor downlink control channels. Consequently, it is possible to prevent a communication throughput from lowering, and improve communication quality.

<Option 3>

According to the option 3, mapping of the downlink control channel candidates is controlled by taking into account aggregation levels, too, in addition to at least one of the search space categorizations, the search space types and the search space IDs. For example, mapping of the downlink control channel candidates in search space sets of the identical search space categorization and search space ID is controlled based on an order of aggregation levels.

A plurality of aggregation levels may be configured to one search space set, or 1 or more different aggregation levels may be configured per search space set.

When, for example, a plurality of Aggregation Levels (ALs=4, 8 and 16) are configured to a certain search space set, the downlink control channel candidates are mapped preferentially on resources (e.g., CCEs) of high aggregation levels. Alternatively, the downlink control channel candidates may be mapped preferentially on resources of low aggregation levels.

Consequently, even when a plurality of aggregation levels are configured to the certain search space set, it is possible to map the downlink control channel candidates in search space sets of given aggregation levels. By determining search space sets to be monitored based, on the search space categorizations, the search space IDs and the aggregation levels within the range that satisfies one or both of the first condition and the second condition, the UE can appropriately monitor downlink control channels.

(Second Aspect)

The second aspect will describe one example of control of mapping of downlink control channel candidates in a case where carrier aggregation is applied (CA). For example, mapping of the downlink control channel candidates in 1 or more search space sets respectively configured to a plurality of CCs (or cells) is controlled based on a given condition. The case where carrier aggregation is applied (CA) according to the present aspect may be a case of cross-carrier scheduling of monitoring PDCCHs the number of which corresponds to a plurality of CCs in a certain CC, may be a case where each PDCCH is monitored in each CC, or a case of both of these cases.

Mapping of the downlink control channel candidates in the search space sets is controlled to satisfy one or both of a first condition that indicates a given number of times of decoding (e.g., the maximum number of times of BD) or less, and a second condition that indicates a given number of CCEs for channel estimation or less.

In this regard, at least one of the first condition and the second condition may be changed based on the number of CCs. Alternatively, there may be employed a configuration where at least one of the first condition and the second condition is changed until the number of CCs reaches a given number of CCs, and at least one condition of the first condition and the second condition is not changed when the number of CCs is larger than the given number of CCs.

Furthermore, mapping of the downlink control channel candidates is controlled based on at least one of search space categorizations, search space types, search space IDs, CC (or cell) categorizations, cell IDs and aggregation levels to satisfy one or both of the first condition and the second condition.

Examples (options 1 to 3) of control of mapping of the downlink control channel candidates will be described below. In addition, the following description will describe a case (see FIG. 2) as an example where three CCs (a CC #0 to CC #2) are configured, and a plurality of Search Space sets (SS sets) are respectively configured to the CC #0 to the CC #2.

FIG. 2 illustrates a case where SS sets #0 and #1 associated with a CSS, and SS sets #2 and #3 associated with a USS are configured in the CC #0, the SS set #0 associated with the CSS and the SS sets #1 and #2 associated with the USS are configured in the CC #1, and the SS sets #0 to #3 associated with the USS are configured in the CC #2. Naturally, for example, the number of CCs and the number of SS sets to be configured are not limited to these.

<Option 1>

Mapping of the downlink control channel candidates in the search space sets is controlled based on at least one of the search space categorizations and the search space types. For example, the search space sets associated with the CSS are prioritized over the search space sets associated with the USS. In one example, the downlink control channel candidates are mapped in the search space sets associated with the CSS prior to the search space sets associated with the USS.

In this case, irrespectively of a Primary Cell (PCell) or a Secondary Cell (SCell), the downlink control channel candidates may be mapped in the search space sets associated with the CSS preferentially over the search space sets associated with the USS. In, for example, FIG. 2, the downlink control channel candidates are mapped preferentially in the SS sets #0 and #1 of the CC #0 and the SS set #0 of the CC #1 associated with the CSS. In addition, the primary cell may be replaced with a PUCCH SCell or a PSCell that transmits a PUCCH.

Consequently, it is possible to preferentially allocate DCI that is commonly configured to a plurality of UEs, so that it is possible to prevent deterioration of quality of overall communication.

Furthermore, regarding the search space sets associated with the CSS, the downlink control channel candidates may be mapped in the search space sets of the primary cell preferentially over those of the secondary cell. For example, the downlink control channel candidates are mapped in order of the search space sets associated with the CSS of the primary cell (e.g., the CC #0 in FIG. 2), the search space sets associated with the CSS of the secondary cell (e.g., the CC #1 in FIG. 2) and the search space sets associated with the USS.

In addition, regarding the search space sets associated with the USS, the downlink control channel candidates may be mapped in the search space sets of the primary cell preferentially over those of the secondary cell.

The UE performs reception processing (e.g., monitor processing or BD processing) within a range that satisfies one or both of the first condition and the second condition. In this case, the UE may determine search space sets to be monitored, based on at least one of search space categorizations (e.g., the CSS or the USS) and the cell categorizations (e.g., the PCell or the SCell). Furthermore, the UE may determine an order of the search space sets to be monitored, based on at least one of the search space categorizations and the cell categorizations.

For example, the UE may monitor the search space sets associated with the CSS prior to the search space sets associated with the USS. Furthermore, the UE may monitor the search space sets of the same search space categorization in the PCell prior to the SCell. Alternatively, the UE may determine the search space sets to be monitored, based on the search space categorizations and the cell categorizations, and then control a monitoring order irrespectively of the search space categorizations and the cell categorizations.

<Option 2>

According to the option 2, mapping of downlink control channel candidates is controlled by taking into account at least one of the search space categorizations and the search space types and, in addition, one or both of cell indices (also referred to as cell IDs, CC numbers and CC indices) and search space IDs.

Figure 3:
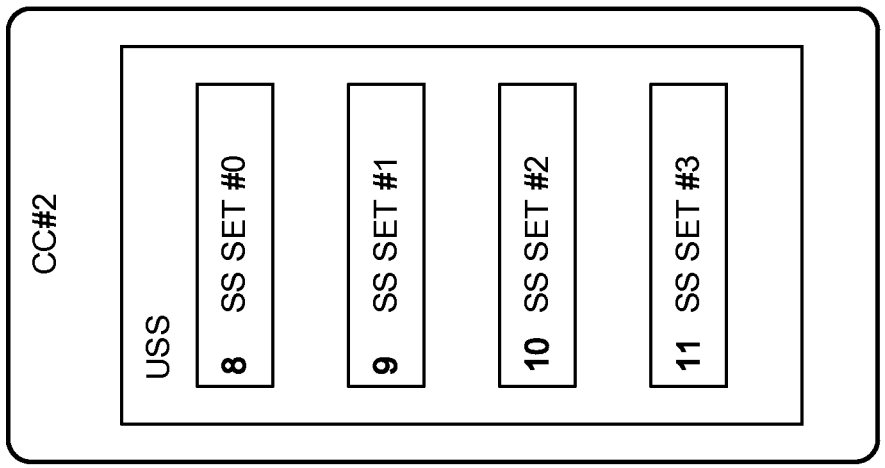
FIG. 3 is a diagram illustrating one example of a method for mapping downlink control channels in the search space sets according to the present embodiment.
Figure 3:
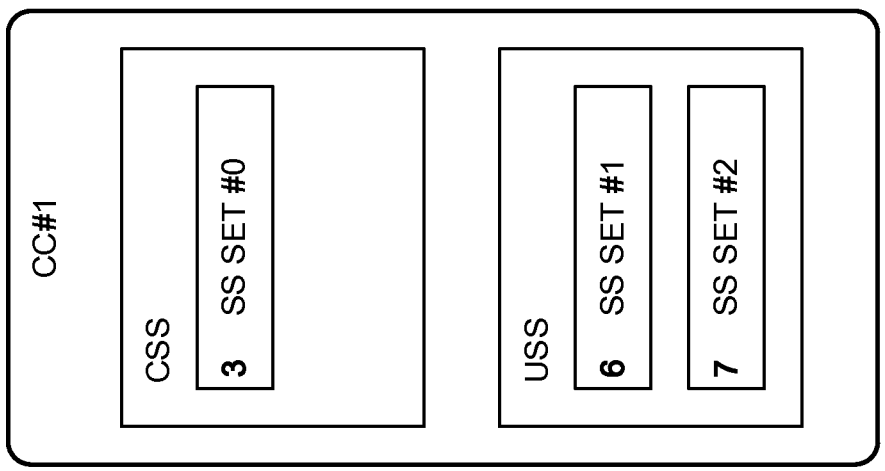
Figure 3:
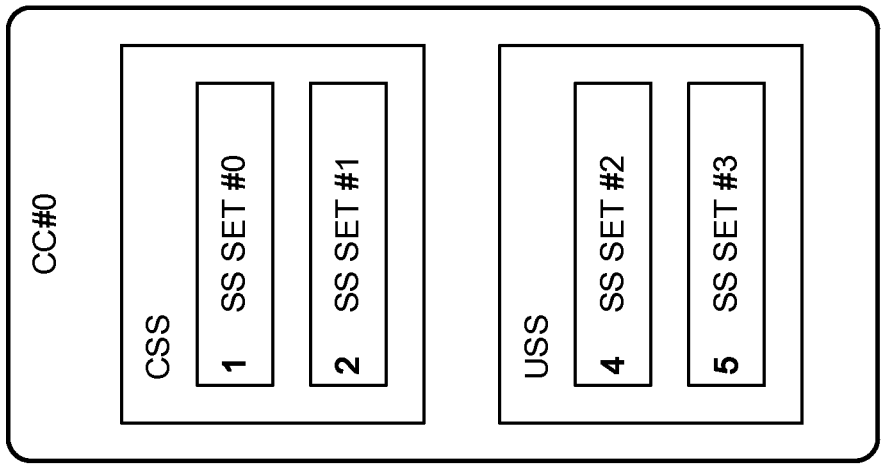

For example, mapping of the downlink control channel candidates in search space sets of an identical search space categorization is controlled based on the cell IDs and the search space IDs. FIG. 3 illustrates regarding the search space sets of the identical search space categorization that the downlink control channel candidates are mapped preferentially in search space sets of smaller cell IDs. Furthermore, FIG. 3 illustrates a case regarding the search space sets associated with the same cell ID where the downlink control channel candidates are mapped preferentially in search space sets of smaller search space IDs.

That is, an order of the search space sets in which the downlink control channel candidates are mapped is determined in order of the search space categorizations (e.g., CSS), the cell IDs (e.g., smaller cell IDs) and the search space IDs (e.g., smaller search space IDs). Thus, by controlling the mapping order of PDCCH candidates by prioritizing the cell IDs over search space IDs, it is possible to locally map the downlink control channel candidates in given cells (e.g., cells of smaller cell IDs). Consequently, when downlink control channels are intensively scheduled to, for example, good quality cells, it is possible to cause the cells to appropriately monitor the downlink control channels.

Figure 4:
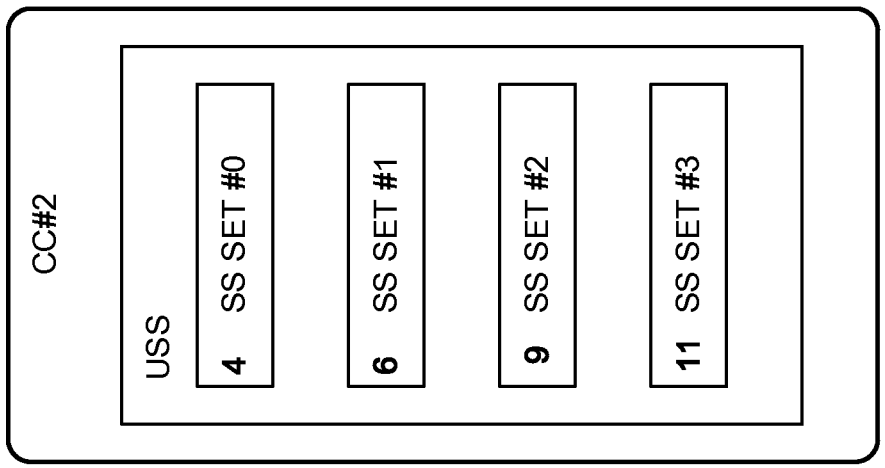
FIG. 4 is a diagram illustrating another example of the method for mapping the downlink control channels in the search space sets according to the present embodiment.
Figure 4:
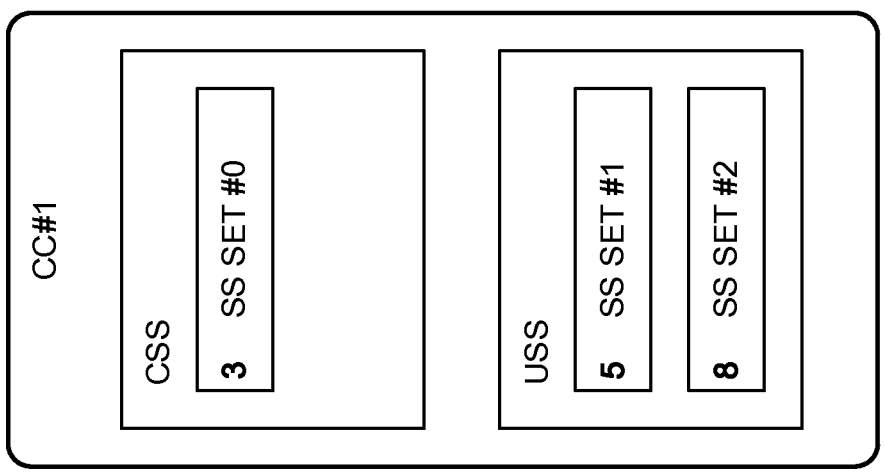
Figure 4:
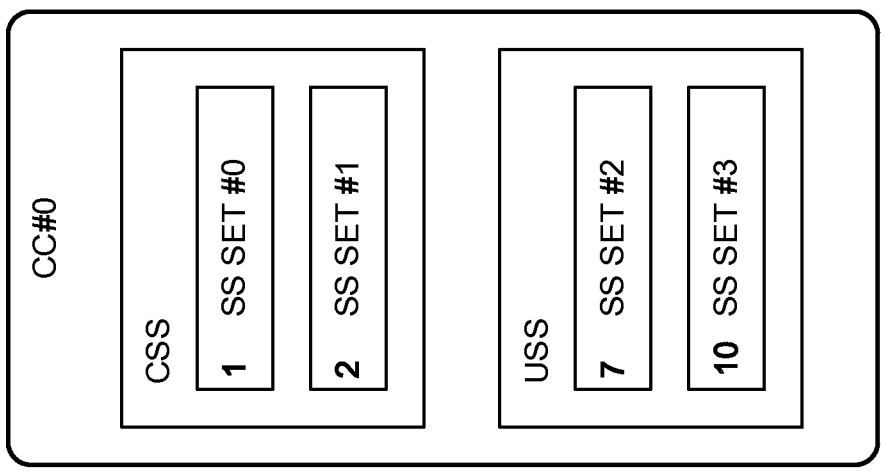

Alternatively, an order of the search space sets in which the downlink control channel candidates are mapped may be determined in order of the search space categorizations (e.g., CSS), the search space IDs (e.g., smaller search space IDs) and the cell IDs (e.g., smaller cell IDs) (see FIG. 4).

FIG. 4 illustrates regarding search space sets of an identical search space categorization that the downlink control channel candidates are mapped preferentially in search space sets of smaller search space IDs. Furthermore, FIG. 4 illustrates a case regarding the search space sets associated with the same search space ID where the downlink control channel candidates are mapped preferentially in search space sets of smaller cell IDs. Thus, by controlling the mapping order of PDCCH candidates by prioritizing the search space IDs over cell IDs, it is possible to distribute the downlink control channel candidates to a plurality of cells to map. Consequently, it is possible to avoid a case where a control channel overhead concentrates on a given cell.

In addition, FIGS. 3 and 4 illustrate the cases regarding the cell IDs and the search space IDs where the search space sets of the smaller indices are prioritized. However, the search space sets of larger indices may be prioritized.

Even when search space sets are respectively configured to a plurality of CCs, it is possible to map the downlink control channel candidates in given search space sets by performing the mapping by taking into account at least one of the search space categorizations and the search space types and, in addition, the cell IDs and the search space IDs. By determining the search space sets to be monitored, based on the search space categorizations, the cell IDs and the search space IDs within a range that satisfies one or both of the first condition and the second condition, the UE can appropriately monitor downlink control channels.

<Option 3>

According to the option 3, mapping of the downlink control channel candidates is controlled by taking into account the aggregation levels, too, in addition to at least one of the search space categorizations, the search space types, the cell IDs and the search space IDs. For example, mapping of the downlink control channel candidates in search space sets of an identical search space categorization, cell ID and search space ID based on an order of aggregation levels.

A plurality of aggregation levels may be configured to one search space set. 1 or more different aggregation levels may be configured per search space set.

When, for example, a plurality of aggregation levels are configured for a certain search space set, the downlink control channel candidates are mapped preferentially on resources of higher aggregation levels. Alternatively, the downlink control channel candidates may be mapped preferentially on resources of lower aggregation levels.

Consequently, even when a plurality of aggregation levels are configured to a certain search space set, it is possible to map the downlink control channel candidates in search space sets of given aggregation levels. By determining the search space sets to be monitored, based on the search space categorizations, the cell IDs, the search space IDs and the aggregation levels within the range that satisfies one or both of the first condition and the second condition, it is possible to appropriately monitor downlink control channels.

<Modified Example>

In addition, the above description has described the case where the search space sets associated with the CSS are prioritized over the search space sets associated with the USS as the mapping order of the downlink control channel candidates, yet is not limited to this. For example, the mapping order of the downlink control channel candidates in search space sets included in each of a plurality of CCs may be determined by prioritizing other conditions (e.g., search space IDs) other than the search space categorizations.

Figure 5:
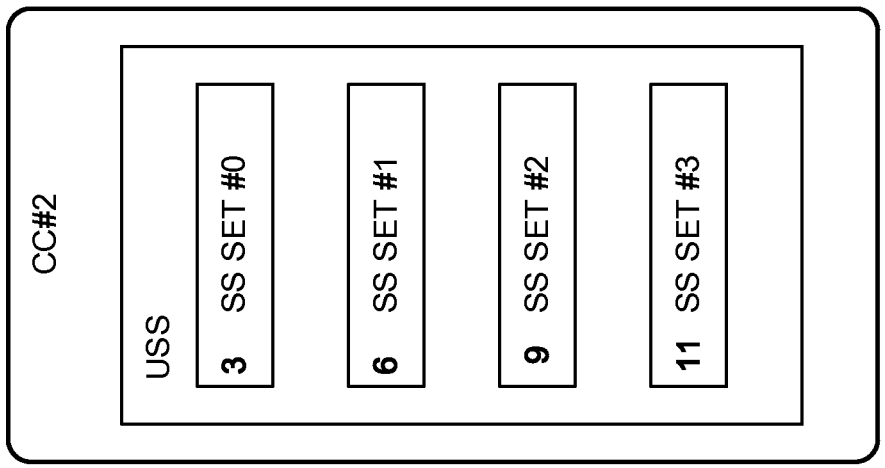
FIG. 5 is a diagram illustrating another example of the method for mapping the downlink control channels in the search space sets according to the present embodiment.
Figure 5:
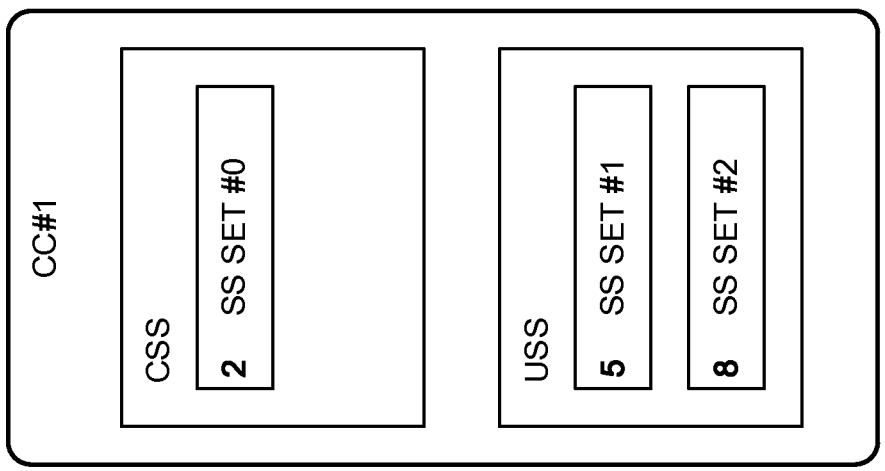
Figure 5:
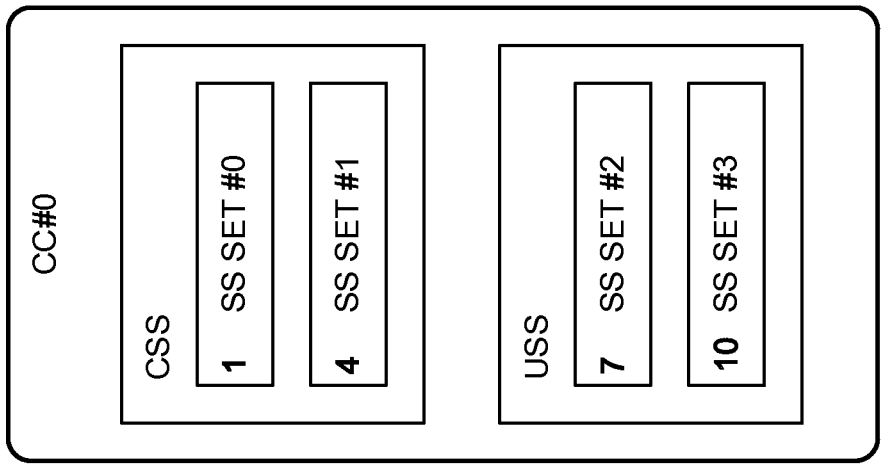

FIG. 5 illustrates regarding the search space sets included in each of a plurality of CCs that the downlink control channel candidates are mapped preferentially in search space sets of smaller search space IDs. In addition, FIG. 5 illustrates a case regarding search space sets associated with the same search space ID where the downlink control channel candidates are mapped preferentially in search space sets of smaller cell IDs.

Thus, by controlling mapping of the downlink control channel candidates by prioritizing at least one of the search space IDs and the cell IDs over the search space categorizations, it is possible to exclude an irregular priority order based on the search space categorizations, and easily configure the control channel candidates based on these IDs.

(Radio Communication System)

The configuration of the radio communication system according to one embodiment of the present invention will be described below. This radio communication system uses one or a combination of the radio communication method according to each of the above embodiment of the present invention to perform communication.

Figure 6:
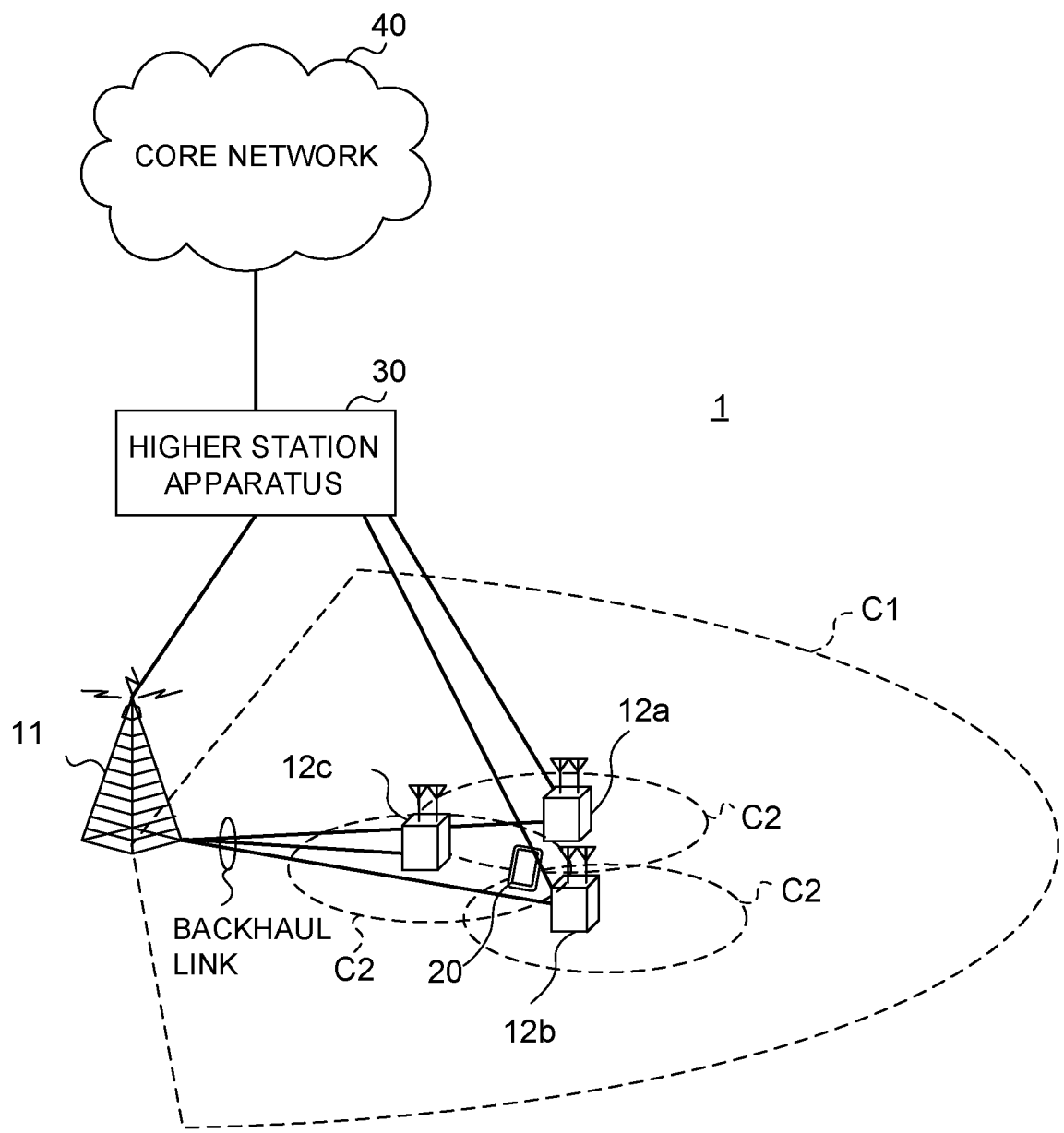
FIG. 6 is a diagram illustrating one example of a schematic configuration of a radio communication system according to one embodiment of the present invention.

FIG. 6 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to the aspect illustrated in FIG. 6.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 may apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink, and applies Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 7:
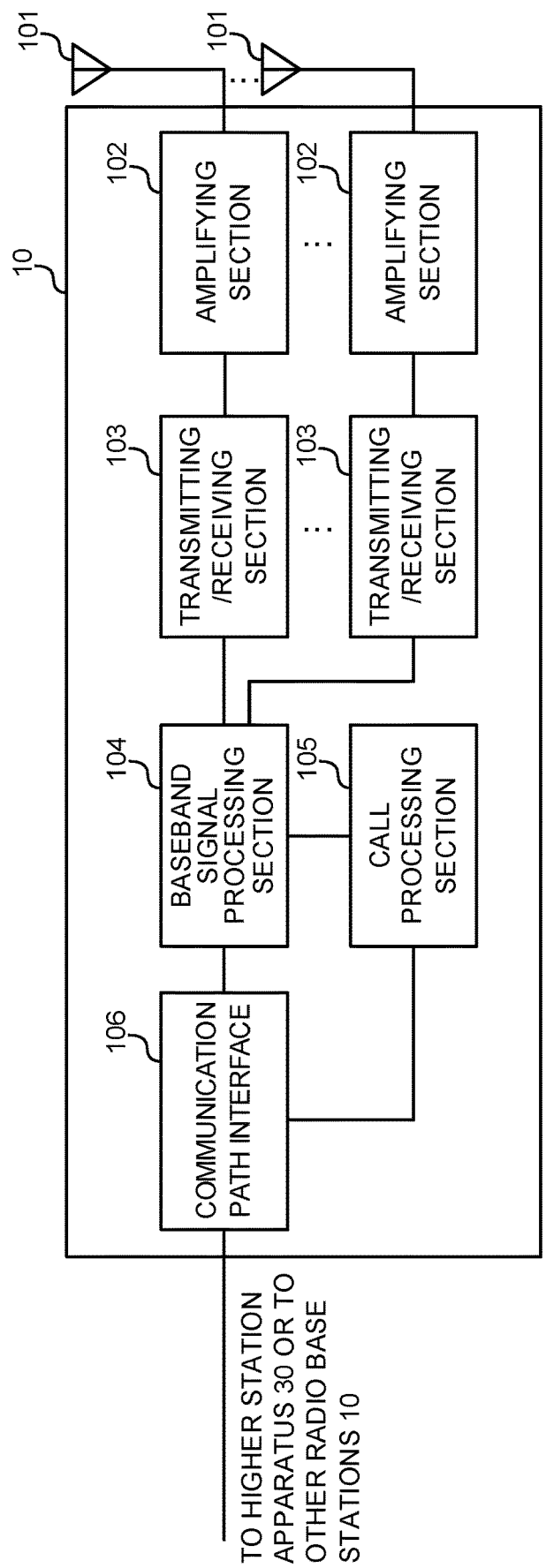
FIG. 7 is a diagram illustrating one example of an overall configuration of a radio base station according to the one embodiment of the present invention.

FIG. 7 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 transmits downlink control information to be allocated to a plurality of search space sets to be configured to 1 or more cells by using a PDCCH. Each transmission/reception section 103 may transmit information (e.g., search space sets) related to the search space sets configured to each cell (or each CC). Furthermore, each transmission/reception section 103 may control transmission of a downlink control channel based on the number of downlink control channels defined per subcarrier-spacing for a given downlink control channel.

Figure 8:
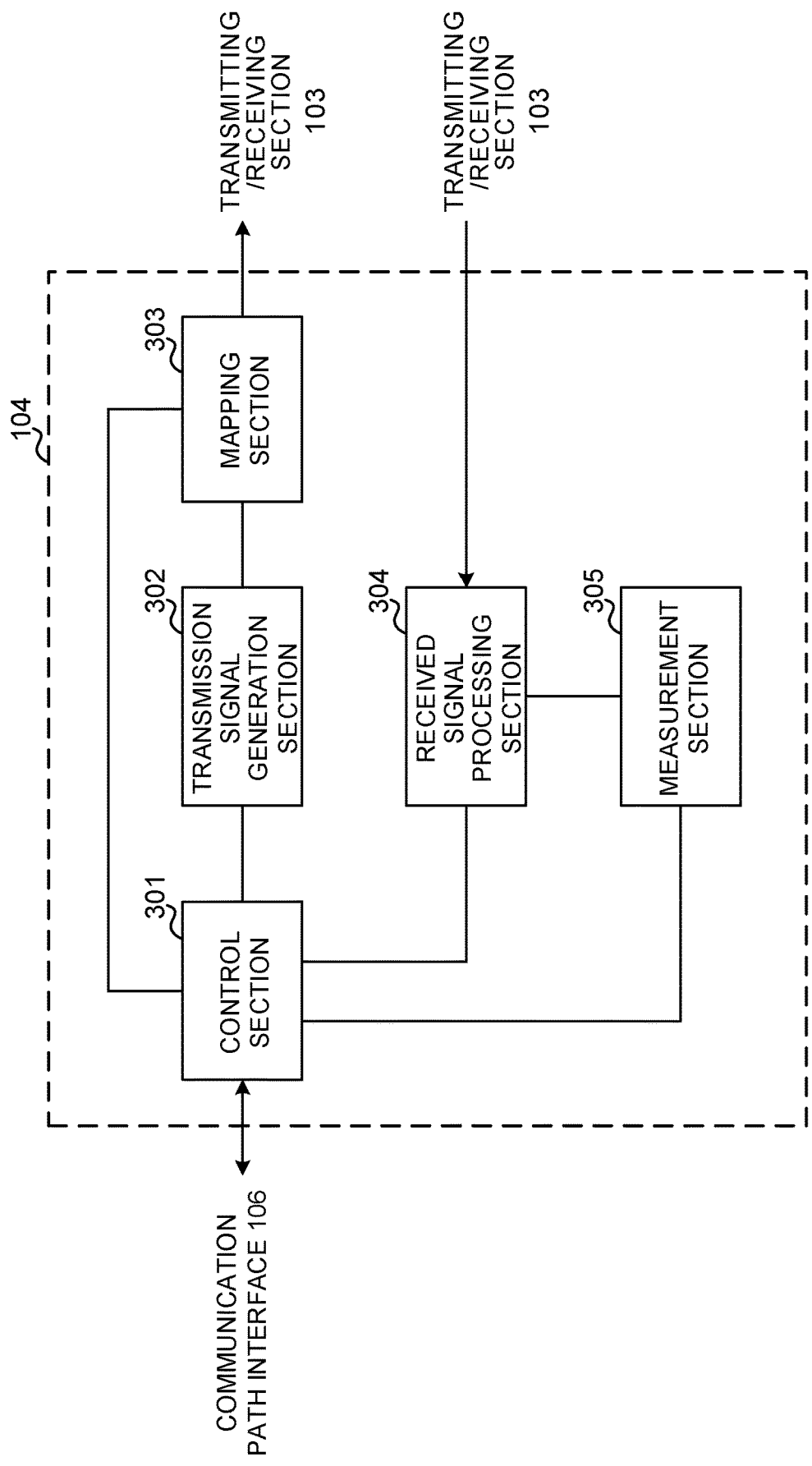
FIG. 8 is a diagram illustrating one example of a function configuration of the radio base station according to the one embodiment of the present invention.

FIG. 8 is a diagram illustrating one example of a function configuration of the radio base station according to the one embodiment of the present invention. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The control section 301 may control transmission of the given downlink control channel based on the number of downlink control channel candidates defined per subcarrier-spacing for the given downlink control channel. Furthermore, the control section 301 controls mapping of the downlink control channel candidates in a plurality of search space sets based on at least one of search space set categorizations, cell indices and search space set indices.

The control section 301 may control mapping of the downlink control channel candidates in a plurality of search space sets to satisfy at least one of a given number of times of decoding or less and a given number of control channel elements or less. Furthermore, the control section 301 may control mapping of the downlink control channel candidates by prioritizing a common search space over a UE-specific search space.

Furthermore, the control section 301 may control mapping of the downlink control channel candidates by prioritizing one of the cell indices and the search space set indices. Furthermore, the control section 301 may control mapping of the downlink control channel candidates based on aggregation levels.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 9:
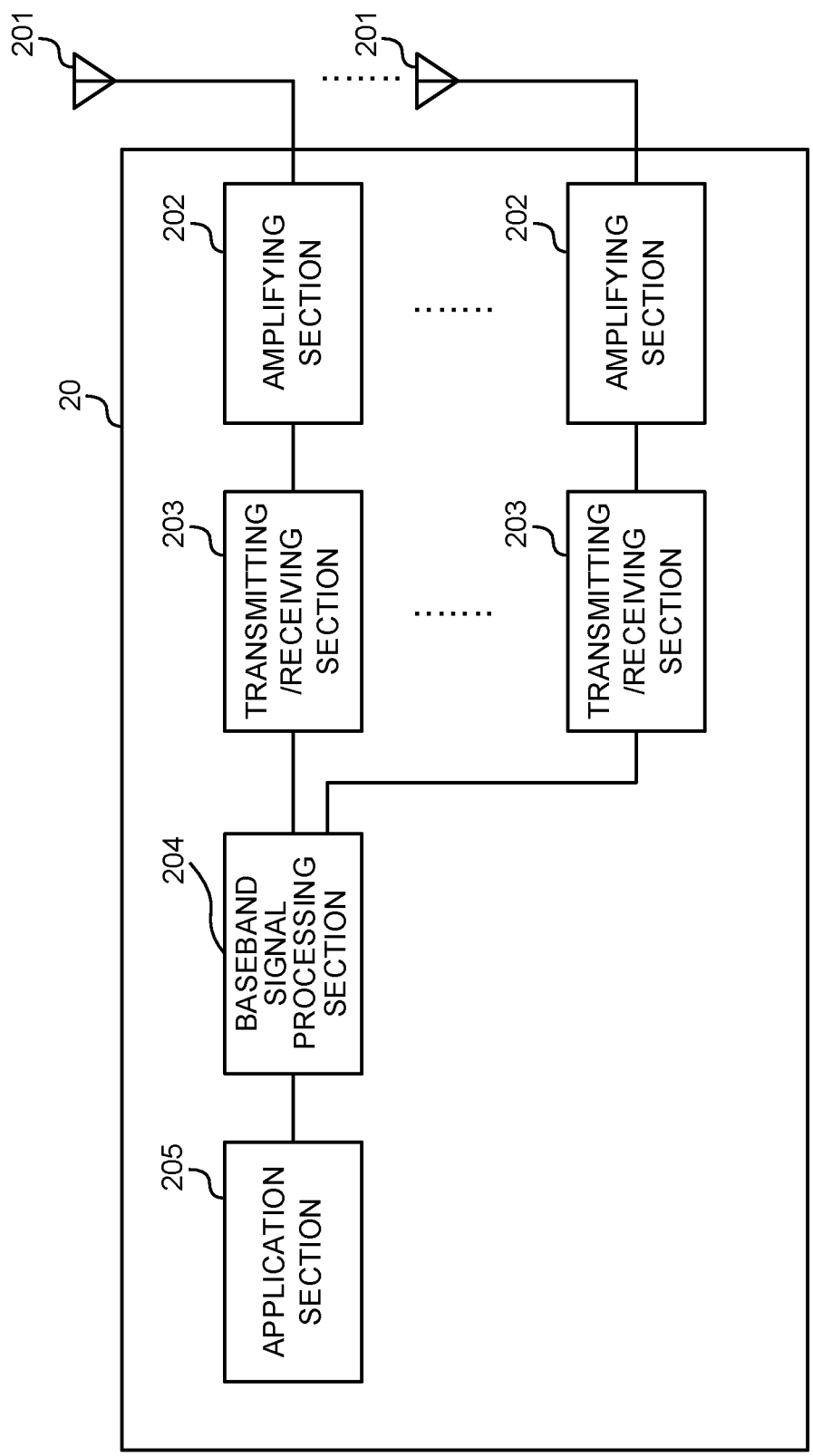
FIG. 9 is a diagram illustrating one example of an overall configuration of a user terminal according to the one embodiment of the present invention.

FIG. 9 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Each transmission/reception section 203 monitors a plurality of search space sets to be configured to the 1 or more cells, and receives the downlink control channel (or the downlink control information). Each transmission/reception section 203 may receive information (e.g., search space sets) related to the search space configured to each cell (or each CC). Furthermore, each transmission/reception section 203 may control reception of the downlink control channel based on the number of downlink control channel candidates defined per subcarrier-spacing for the given downlink control channel.

Figure 10:
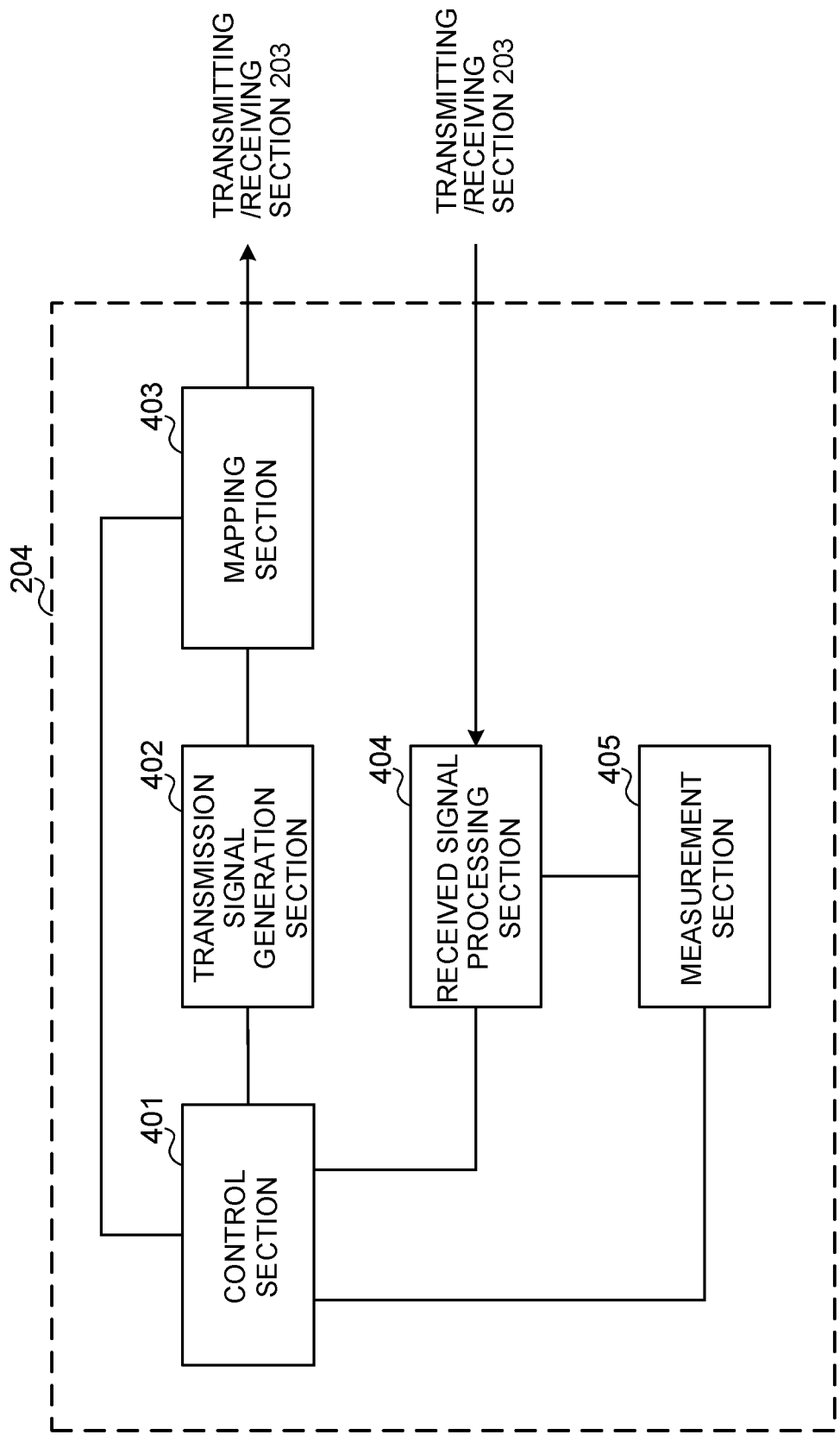
FIG. 10 is a diagram illustrating one example of a function configuration of the user terminal according to the one embodiment of the present invention.

FIG. 10 is a diagram illustrating one example of a function configuration of the user terminal according to the one embodiment of the present invention. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 controls monitoring of a plurality of search space sets in which the downlink control channel candidates have been mapped, based on at least one of the search space set categorizations, the cell indices and the search space set indices. Furthermore, the control section 401 may control reception processing of the given downlink control channel based on the number of downlink control channel candidates defined per subcarrier-spacing for the given downlink control channel.

The control section 401 may control monitoring of the downlink control channel candidates for a plurality of search space sets to satisfy at least one of the given number of times of decoding or less and the given number of control channel elements or less. Furthermore, the control section 401 may control monitoring of the downlink control channel candidates by prioritizing the common search space over the UE-specific search space.

Furthermore, the control section 401 may control monitoring of the downlink control channel candidates by prioritizing one of the cell indices and the search space set indices. Furthermore, the control section 401 may control monitoring the downlink control channel candidates based on the aggregation levels.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 11:
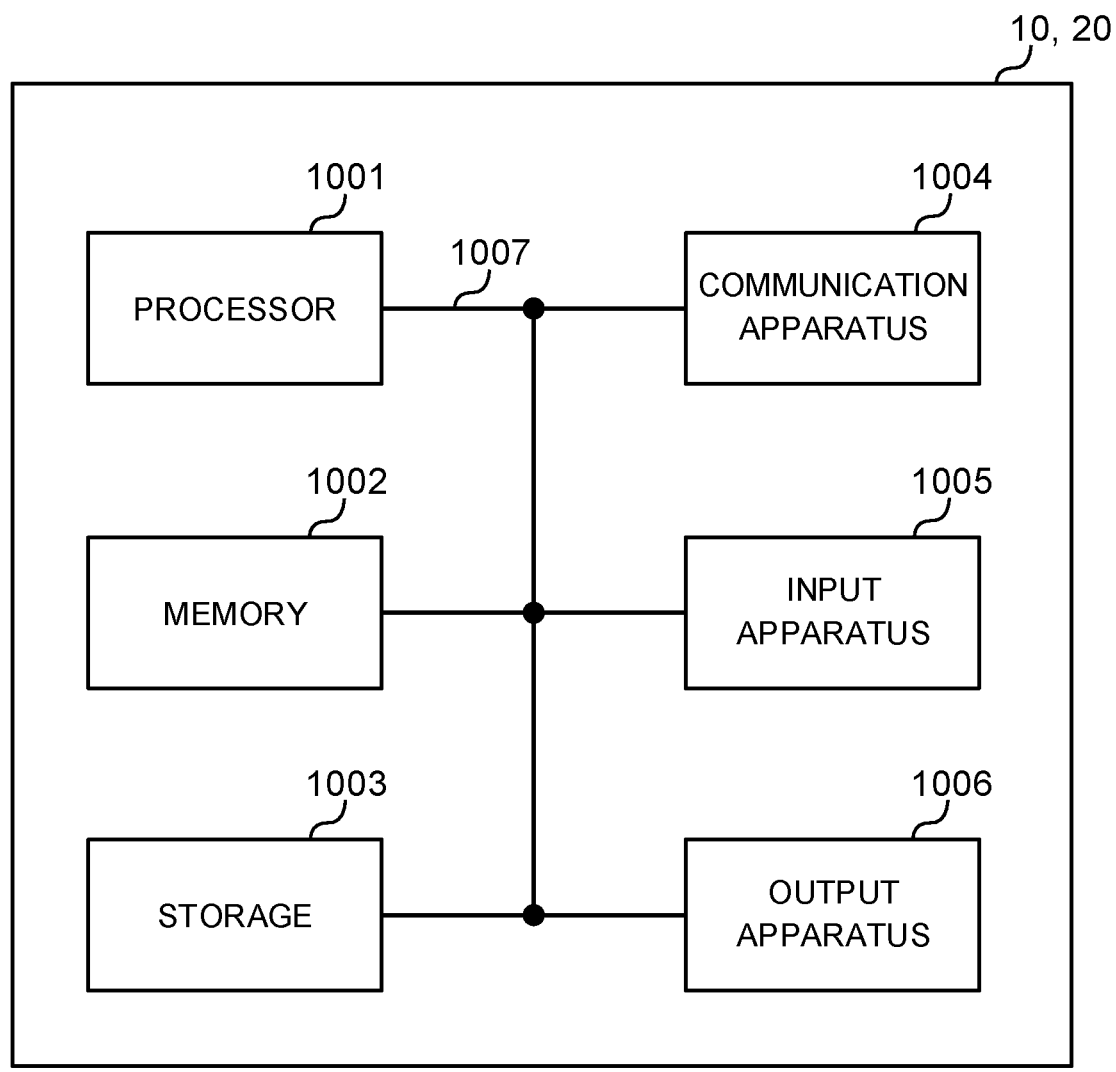
FIG. 11 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 11 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by 1 processor or processing may be executed by 1 or more processors concurrently, successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

(Modified Example)

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing.

That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically, logically or by a combination of the physical and logical connections. For example, "connection" may be read as "access".

It can be understood that, when connected in this description, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
a receiver that receives information comprising a first indicator regarding a search space set categorization and a second indicator regarding a search space set index, the first indicator and the second indicator corresponding to each of one or more search space sets; and
a processor that controls a monitoring of downlink control channel candidates allocated to each of the search space sets based on the search space set categorization and the search space set index,
wherein the downlink control channel candidates are allocated to a common search space set, and then the downlink control channel candidates are allocated to a UE-specific search space set in an order according to the search space set index.

2. A radio communication method comprising:
receiving information comprising a first indicator regarding a search space set categorization and a second indicator regarding a search space set index, the first indicator and the second indicator corresponding to each of one or more search space sets; and
monitoring of downlink control channel candidates allocated to each of the search space sets based on the search space set categorization and the search space set index,
wherein the downlink control channel candidates are allocated to a common search space set, and then the downlink control channel candidates are allocated to a UE-specific search space set in an order according to the search space set index.

3. A base station comprising:
a transmitter that transmits information comprising a first indicator regarding a search space set categorization and a second indicator regarding a search space set index, the first indicator and the second indicator corresponding to each of one or more search space sets; and
a processor that controls a transmission of downlink control channel candidates allocated to each of the search space sets based on the search space set categorization and the search space set index,
wherein the downlink control channel candidates are allocated to a common search space set, and then the downlink control channel candidates are allocated to a UE-specific search space set in an order according to the search space set index.

4. A system comprising a terminal and a base station:
the terminal comprises:
a receiver that receives information comprising a first indicator regarding a search space set categorization and a second indicator regarding a search space set index, the first indicator and the second indicator corresponding to each of one or more search space sets; and
a processor that controls a monitoring of downlink control channel candidates allocated to each of the search space sets based on the search space set categorization and the search space set index,
wherein the downlink control channel candidates are allocated to a common search space set, and then the downlink control channel candidates are allocated to a UE-specific search space set in an order according to the search space set index, and
the base station comprises:
a transmitter that transmits the information; and
a processor that controls a transmission of the downlink control channel candidates.

* * * * *